United States Patent
Ariga et al.

(10) Patent No.: US 6,333,063 B2
(45) Date of Patent: Dec. 25, 2001

(54) HIGH-PROTEIN FOOD OF PLATE FORM

(75) Inventors: Toshiaki Ariga; Tatuo Manaka; Emiko Yamazaki; Akio Obata; Norikazu Fujii; Nobuyuki Yamaji; Mamoru Kikuchi, all of Noda; Keizo Tsuruta, Okazaki; Michiko Watanabe, Higashimurayama, all of (JP)

(73) Assignees: Kikkoman Corporation, Chiba Pref.; WF POP Co., Ltd., Aichi Pref., both of (JP)

( * ) Notice: Subject to any disclaimer, the term of this patent is extended or adjusted under 35 U.S.C. 154(b) by 0 days.

(21) Appl. No.: 09/749,769

(22) Filed: Dec. 28, 2000

(30) Foreign Application Priority Data

Dec. 28, 1999 (JP) .................................. 11-372766
Dec. 28, 1999 (JP) .................................. 11-372767

(51) Int. Cl.[7] .................................. A23J 1/00; A23J 1/12; A23J 1/14; A23J 1/20
(52) U.S. Cl. ..................... 426/656; 426/445; 426/512; 426/657
(58) Field of Search ..................... 426/656, 512, 426/445, 285, 657

(56) References Cited

U.S. PATENT DOCUMENTS 4,565,702  *  1/1986  Morley et al. .
4,888,198  * 12/1989  Beery et al. .
6,045,849  *  4/2000  Ariga et al. .

* cited by examiner

Primary Examiner—Anthony J. Weier
(74) Attorney, Agent, or Firm—Young & Thompson

(57) ABSTRACT

A high-protein food of plate form having a protein content of 40% by weight or more and a bulk density of 0.02 to 0.40 g/cm$^3$, which is obtained by puffing-molding a compound protein raw material having a protein content of 40% by weight or more.

4 Claims, No Drawings

HIGH-PROTEIN FOOD OF PLATE FORM

BACKGROUND OF THE INVENTION

1. Field of the Invention

The present invention relates to a novel high-protein food of plate form which has a protein content of 40% by weight or more and to a process for producing the same. More particularly, it relates to a high-protein food of plate form which belongs to the category called "proteins" or "compound proteins" used in the food field as a health food, a nutrient supplementary food and which is portable, easy to take, and crisp.

2. Description of the Related Art

High-protein foods called "protein supplements", "compound proteins" or simply "proteins" have been spreading, with the primary selling point put on high protein and low fat. They have incorporated therein various vitamins, minerals, flavors, and the like in appropriate amounts and have now been utilized in the food field including health foods and nutrient supplementary foods. For example, they find use as an aid for strengthening the muscles for athletes, weight reduction for obese persons, supplying nutrition to postoperative patients, improving nutritional balance of diets, and the like.

The protein content, the main ingredient, of these high-protein foods is usually at least 70% by weight for athletes and at least 40% by weight, desirably 50% by weight or more, for other uses. From the standpoint of appeal to consumers and preservability, it is preferred for the high-protein foods to have a low lipid content, desirably 10% by weight or lower. For labeling as a low-fat food, the lipid content must be 3% by weight or lower.

It has been difficult to shape a high-protein food into a plate form because of its high protein content and a low lipid content. It is very difficult to make a high-protein food in plate form with, for example, a conventional process customarily used for making cookies or crackers. Therefore, most of the high-protein foods available are powders or granules. There are no lumpy or plate-shaped ones that have both a protein content of 40% by weight or more and a lipid content of 10% by weight or less.

The term "plate form" or "plate-shaped" as used herein is intended to mean a shape with a substantially constant thickness (acceptable variation: mean thickness±about 50%) with any cross section, which typically includes a sheet and a disc. Blocks, cylinders, and the like are also included.

High-protein products in powder form are usually sold on the market in cans or bags holding several hundred grams to one kilogram, which are inconvenient to carry. Some powdered products are packaged in bags holding several tens grams but still have the problem of inconvenience because liquid such as water or milk and a cup are always needed to dissolve the powder. In addition powdered high-protein foods hardly dissolve in water, milk, etc. and are not easy to take and also give no substance to get one's teeth into.

Ordinary plate-shaped foods containing protein, such as cookies, crackers and Japanese rice crackers, have a protein content usually of 10% by weight or less. It is rare for these foods to have a protein content exceeding 20% by weight. The lipid content of these foods, on the other hand, is usually 10% by weight or more and not infrequently exceeds 20% by weight.

Thus, having a small protein content and a high lipid content, ordinary protein-containing foods of plate form cannot serve for the intended applications of the above-mentioned high-protein foods.

SUMMARY OF THE INVENTION

An object of the present invention is to provide a high-protein food having a protein content of 40% by weight or more which is portable, ready to eat with no need to dissolve in water, milk, etc. and crisp.

As a result of extensive study, the present inventors have found that a raw material composition having a protein content of 40% by weight or more can be shaped into a plate by processing in a batch type puffing molding machine.

Based on the above finding, the present invention provides a high-protein food of plate form which has a protein content of 40% by weight or more and a bulk density of 0.02 to 0.40 $g/cm^3$.

The present invention also provides a process for producing a high-protein food of plate form which comprises puffing-molding a raw material composition having a protein content of 40% by weight or more.

DETAILED DESCRIPTION OF THE INVENTION

The high-protein food of plate form according to the invention has a bulk density of 0.02 to 0.40 $g/cm^3$, preferably 0.04 to 0.20 $g/cm^3$. As long as it has a plate form with a bulk density falling within this range, it is not particularly limited in size. Taking portability, ease of eating, and ease of molding into consideration, the high-protein food is preferably 0.2 to 10 g in weight and about 0.03 to 3 cm in thickness per plate.

The protein content of the high-protein food of the invention can be selected appropriately from a range of 40% by weight and higher according to the type of consumers or the purpose of eating the food. Taking moldability, crispness, and flavor into consideration, a preferred protein content is 50 to 90% by weight, particularly 60 to 85% by is weight.

The source of protein used in the high-protein food of the present invention is not limited and includes protein-rich raw materials conventionally used in protein foods, such as a soy protein isolate, concentrated soy protein, milk protein, wheat protein (gluten), fish meat protein, and Spirulina. From the viewpoint of moldability, a soy protein isolate, concentrated soy protein, and milk protein are preferred. If desired, enzymatic decomposition products of these proteins are also useful.

The lipid content of the high-protein foods of the invention is preferably not more than 10% by weight, still preferably 3% by weight or lower.

It is preferred to incorporate into the high-protein food of the present invention 0.005 to 0.80% by weight, particularly 0.02 to 0.20% by weight, of a proanthocyanidin to make the food crisp.

The proanthocyanidin which can be added preferably includes extracts of grape seeds, which are commercially available from Kikkoman Corp. under trade names Gravinol, Gravinol Super and KPA-F.

The high-protein foods of the present invention can further contain various subsidiary materials customarily used in this type of foods. Useful subsidiary materials include sweeteners, such as sucrose, glucose, and stevioside; dietary fiber, such as cellulose and pectin; amino acids; peptide; vitamins, such as vitamins A, $B_1$, $B_2$, $B_6$, $B_{12}$, C, D, and E, and folic acid; minerals, such as calcium salts, magnesium salts, and iron salts; lecithin, herb extract, vegetable juice, fruit juice, and flavors. In particular, it is preferred to incorporate one or more nutrient supplementary foodstuffs selected from herb extracts, vitamins and minerals that have been used as an active ingredient of health foods.

An illustrative example of preferred formulations of the high-protein foods according to the present invention is shown below.

| FORMULATION EXAMPLE | |
|---|---|
| Protein | 50 to 90 wt % |
| Lipid | 10 wt % or less |
| Carbohydrate | 0 to 45 wt % |
| Proanthocyanidin | 0.005 to 0.80 wt % |
| Vitamins | 0.0001 to 0.5 wt % |
| Minerals | 0.01 to 0.2 wt % |

The process for producing the high-protein food of plate form according to the present invention will be described with reference to its preferred embodiments.

The process of the invention starts with preparation of a raw material composition comprising raw materials of the high-protein food of the invention. That is, a raw protein, a carbohydrate, a proanthocyanidin, subsidiary materials, etc. are compounded into a raw material composition having a protein content of 40% by weight or more, preferably according to the above-described preferred formulation.

The raw material composition may be in powder form but is preferably granules, particles, spheres or plates having a water content of 5 to 30% by weight, particularly 10 to 20% by weight. The raw material composition can be prepared in a known manner. For example, a granular or plate-shaped raw material composition can be prepared as follows.

A mixed powder of the raw materials is kneaded with water and molded into a lumpy or plate-shaped intermediate raw material composition. The form of the intermediate raw material composition depends on the kind of the protein source. The amount of water to be added, while dependent on the kind of the protein source, is usually 1 to 2 times the weight of the raw material mixture. Kneading is carried out in a mixing machine for about 5 to 10 minutes.

The plate-shaped intermediate raw material composition can be dried as such in a known manner to provide a raw material composition of plate form having a water content of 5 to 30% by weight, preferably 10 to 20% by weight.

A granular raw material composition can be obtained by rolling the plate-shaped intermediate raw material composition into a sheet, cutting the sheet into about 3 to 8-mm square pellets and drying the pellets in a known manner to a water content of 5 to 30% by weight, preferably 10 to 20% by weight, grinding the resulting dried pellets, and sieving the grinds. A granular raw material composition can also be obtained by drying the lumpy intermediate raw material composition to the same water content as described above, and treating the dried lumps in the same manner as for the dried pellets.

The thus prepared granular raw material composition is subjected to puffing molding to prepare a high-protein food of plate form according to the present invention.

The puffing molding is carried out by hot pressing a mold packed with the granular composition and then releasing pressure. Such puffing molding is preferably achieved with a batch type puffing molding apparatus, such as Rice Cake Machine (trade name) supplied by WE.POP Co., Ltd., at a heating temperature of 140 to 270° C., preferably 180 to 230° C., under a pressure of 200 to 3000 kPa(gauge), preferably 400 to 1500 kPa(gauge), for a heating time of 0.5 to 20 seconds, preferably 2 to 5 seconds.

The puffing molding conditions such as the heating temperature, the heating time, the pressure applied, the rate of pressure release, and the like are controlled so that the resulting product may have a bulk density of 0.02 to 0.40 $g/cm^3$, preferably 0.04 to 0.20 $g/cm^3$.

Test Example is shown below, in which the effect of proanthocyanidin addition in improving crispness is demonstrated. Unless otherwise noted, all the percents are by weight.

TEST EXAMPLE 1

Ten kinds of raw material mixtures were prepared from ARDEX-F-Dispersible available from Archer Daniels Midland Co. (protein content: 90%) as a soy protein isolate and Gravinol Super available from Kikkoman Corp. (proanthocyanidin content: 90%) as a proanthocyanidin according to the mixing ratio shown in Table 1 below.

A 100 g portion of each mixture was kneaded with 150 g of water and shaped into a block (intermediate raw material composition). The block was rolled into a sheet and cut into about 5-mm square pellets. The pellets were dried in a drier to a water content of 16%, ground, and sieved to obtain 9 mesh or smaller granules.

The granules were put in a batch type puffing molding apparatus (Rice Cake Machine supplied by WE.POP Co., Ltd.) in an amount of 2.5 $cm^3$ per batch and puffing-molded under conditions of a heating temperature of 210° C., a heating time of 3 seconds and a pressure of 1000 kpa(gauge) to obtain a high-protein food of plate form having a weight of 0.95 to 1.18 g, a width of 2.9 to 3.0 cm, a length of 6.6 to 6.8 cm, a thickness of 0.50 to 0.75 cm, and a bulk density of 0.090 to 0.215 $g/cm^3$ per piece.

The resulting high-protein foods of plate form were organoleptically evaluated by 20 panel members in terms of crispness and palatability inclusive of taste, flavor and texture on the following -3 to +3 scale. The results obtained are shown in Table 1. It is seen from Table 1 that addition of 0.005 to 0.80% of a proanthocyanidin brings about a noticeable improvement on crispness and palatability.

Scale of Evaluation:
+3: Much better than the control
+2: Better than the control
+1: Slightly better than the control
0: No difference from the control
−1: Slightly worse than the control
−2: Worse than the control
−3: Much worse than the control

TABLE 1

| | Mixing Ratio (%) | | | |
|---|---|---|---|---|
| Run No. | Soy Protein Isolate* | Proantho-cyanidin** | Bulk Density ($g/cm^3$) | Crispness | Palatability |
| Con-trol 1 | 100.000 | 0 | 0.094 | 0 | 0 |
| 1 | 99.999 | 0.001 | 0.101 | +0.072 | +0.010 |
| 2 | 99.995 | 0.005 | 0.122 | +0.301 | +0.102 |
| 3 | 99.990 | 0.010 | 0.135 | +0.650 | +0.251 |
| 4 | 99.980 | 0.020 | 0.143 | +0.857 | +0.429 |
| 5 | 99.960 | 0.040 | 0.155 | +1.095 | +0.857 |

TABLE 1-continued

| | Mixing Ratio (%) | | | | |
|---|---|---|---|---|---|
| Run No. | Soy Protein Isolate* | Proantho-cyanidin** | Bulk Density (g/cm$^3$) | Crisp-ness | Palat-ability |
| 6 | 99.800 | 0.200 | 0.162 | +0.714 | +0.619 |
| 7 | 99.600 | 0.400 | 0.174 | +0.429 | +0.381 |
| 8 | 99.200 | 0.800 | 0.185 | +0.376 | +0.150 |
| 9 | 98.000 | 2.000 | 0.215 | +0.333 | −1.143 |

*Purity: 90%
**Purity: 90%

The present invention will now be illustrated in greater detail by way of Examples, but it should be understood that the invention is not construed as being limited thereto.

EXAMPLE 1

A soy protein isolate (Fujipro AL, available from Fuji Protein Technology; protein content:91%) weighing 10 kg was mixed by stirring with 15 kg of water in a mixing machine to prepare intermediate raw material composition of block form. The block was rolled into a sheet, and the sheet was cut into about 5-mm square pellets. The pellets were dried in a drier to a water content of 13%, ground, and sieved to obtain granules of 9 mesh or smaller.

The resulting granules were puffing-molded under the same conditions as in Test Example 1 to obtain a high-protein food of plate form having a weight of 1.12±0.1 g, a width of 2.9±0.2 cm, a length of 6.7±0.3 cm, a thickness of 0.70±0.10 cm, and a bulk density of 0.112±0.016 g/cm$^3$ per piece.

EXAMPLE 2

A mixture consisting of 60 kg of a soy protein isolate (Fujipro AL, available from Fuji Protein Technology; protein content: 91%), 20 kg of calcium citrate, and 20 kg of fructose (total weight: 100 kg) was mixed by stirring with 150 kg of water to prepare an intermediate raw material composition of block form. The block was rolled into a sheet, and the sheet was cut into about 5-mm square pellets. The pellets were dried in a drier to a water content of 14%, ground, and sieved to obtain granules of 9 mesh or smaller.

The resulting granules were puffing-molded in the same manner as in Test Example 1, except that the pressure was changed to 1470 kPa(gauge), to obtain a high-protein food of plate form having a weight of 1.10±0.1 g, a width of 2.8±0.2 cm, a length of 6.6±0.3 cm, a thickness of 0.65±0.1 cm, and a bulk density of 0.105±0.015 g/cm$^3$ per piece.

EXAMPLE 3

A mixture consisting of 75 kg of a soy protein isolate (Fujipro AL, available from Fuji Protein Technology; protein content: 91%), 5 kg of an isoflavone aglicon (Soyact, available from Kikkoman Corp.; isoflavone aglicon content: 30%), and 20 kg of fructose (total weight: 100 kg) was processed in the same manner as in Example 2 to obtain 82142 plate-shaped pieces of an isoflavone aglicon-containing high-protein food each having a weight of 1.12±0.1 g, a width of 2.8±0.2 cm, a length of 6.1±0.3 cm, a thickness of 0.66±0.1 cm, and a bulk density of 0.112±0.016 g/cm$^3$.

The high-protein food of plate form according to the present invention has a protein content of 40% by weight or more and a bulk density of 0.02 to 0.40 g/cm$^3$. It is a ready-to-eat food that can be taken as such without being dissolved in water, milk or a like liquid and is therefore excellent in portability, convenience to eat, and crispness.

What is claimed is:

1. A high-protein food of plate form which has a protein content of 40% by weight or more and a bulk density of 0.04 to 0.20 g/cm$^3$ and is formed by puffing-molding.

2. The high-protein food of plate form according to claim 1, which has a lipid content of 10% by weight or less.

3. The high-protein food of plate form according to claim 1, which contains at least one nutrient supplementary foodstuffs selected from herb extracts, vitamins, and minerals.

4. The high-protein food of plate form according to claim 1, which contains 0.005 to 0.80% by weight of a proanthocyanidin.

* * * * *